(12) United States Patent
Jones et al.

(10) Patent No.: US 10,142,457 B2
(45) Date of Patent: Nov. 27, 2018

(54) SYSTEM AND METHOD FOR LIMITING USAGE OF A WIRELESS COMMUNICATION DEVICE

(71) Applicant: ARTIFEX SOFTWARE INC., San Rafael, CA (US)

(72) Inventors: Miles Jones, San Rafael, CA (US); Michael J. Vrhel, Sammamish, WA (US); Scott Sackett, Krum, TX (US)

(73) Assignee: Artifex Software Inc., San Rafael, CA (US)

( * ) Notice: Subject to any disclaimer, the term of this patent is extended or adjusted under 35 U.S.C. 154(b) by 20 days.

(21) Appl. No.: 14/180,906

(22) Filed: Feb. 14, 2014

(65) Prior Publication Data
US 2015/0237195 A1 Aug. 20, 2015

Related U.S. Application Data

(63) Continuation-in-part of application No. 13/401,733, filed on Feb. 21, 2012, now Pat. No. 8,774,842.
(Continued)

(51) Int. Cl.
*H04M 1/725* (2006.01)
*H04W 4/04* (2009.01)

(52) U.S. Cl.
CPC ... *H04M 1/72577* (2013.01); *H04M 1/72572* (2013.01); *H04W 4/04* (2013.01)

(58) Field of Classification Search
CPC ....... H04W 12/06; H04W 84/18; H04W 8/18; H04W 12/02; H04W 8/005; H04W 12/08;
(Continued)

(56) References Cited

U.S. PATENT DOCUMENTS

2004/0209594 A1* 10/2004 Naboulsi ............... G08B 21/06
455/404.1
2005/0048972 A1* 3/2005 Dorenbosch .......... H04W 36/32
455/436
(Continued)

*Primary Examiner* — Natasha W Cosme
(74) *Attorney, Agent, or Firm* — Fitzsimmons IP Law

(57) ABSTRACT

A system and method is provided for limiting, disabling and/or activating a wireless communication device during operation of a vehicle or participation in an activity. In one embodiment of the present invention, the system includes a wireless transmission device and a wireless communication device. The wireless transmission device, which includes at least one wireless transmitter, a processor, and a memory device, is configured to transmit a first wireless signal toward a first designated region, and a second wireless signal toward a second designated region. The wireless communication device, which includes at least one wireless receiver, a processor, a memory device, a keypad, and a display, is configured to receive the first wireless signal and, in response thereto, limit or disable certain features of the wireless device. This can be done by disabling certain features (e.g., cellular service, Bluetooth™, telephone calls, text messaging, emailing, its antenna, its keyboard, and/or its display) or disabling (e.g., powering down, etc.) the entire cell phone. The wireless communication device is further configured to receive a second wireless signal and, in response thereto, enable the features that have been disabled or limited via the first wireless signal. In a preferred embodiment of the present invention, the first wireless signal is a Bluetooth signal, and the second wireless signal is an IR signal.

20 Claims, 6 Drawing Sheets

Related U.S. Application Data

(60) Provisional application No. 61/585,524, filed on Jan. 11, 2012.

(58) Field of Classification Search
CPC ..... H04W 12/10; H04W 12/12; H04W 48/04; H04W 4/021; H04W 4/046; H04W 4/14; H04W 4/18; H04W 52/0261; H04W 52/0264; H04W 74/00; H04W 84/02; H04W 88/02
USPC .................. 455/456.4, 566, 418, 404.1, 403
See application file for complete search history.

(56) References Cited

U.S. PATENT DOCUMENTS

| | | | | |
|---|---|---|---|---|
| 2008/0095097 | A1* | 4/2008 | Mehta | H04W 48/04 370/328 |
| 2008/0139118 | A1* | 6/2008 | Sanguinetti | H04B 1/406 455/41.2 |
| 2010/0120364 | A1* | 5/2010 | Lee | H04W 8/005 455/41.2 |
| 2011/0111724 | A1* | 5/2011 | Baptiste | H04M 1/6075 455/404.1 |
| 2013/0084847 | A1* | 4/2013 | Tibbitts | H04W 8/245 455/419 |
| 2014/0213234 | A1* | 7/2014 | Inselberg | H04W 4/021 455/418 |

\* cited by examiner

SYSTEM AND METHOD FOR LIMITING USAGE OF A WIRELESS COMMUNICATION DEVICE

CROSS-REFERENCE TO RELATED APPLICATION

This application is a continuation-in-part of co-pending application Ser. No. 13/401,733, filed Feb. 21, 2012, which claims priority pursuant to 35 U.S.C. § 119(e) to U.S. provisional patent application Ser. No. 61/585,524, filed Jan. 11, 2012, the subject matter of both are incorporated herein in their entirety by reference.

BACKGROUND OF THE INVENTION

1. Field of the Invention

The present invention relates to a wireless communication device, and more particularly, to a system and method for limiting, disabling and/or enabling usage of a wireless communication device in a designated region and/or during a designated state.

2. Description of Related Art

There have been a number of studies that have shown that it is dangerous to operate a motor vehicle while using a wireless communication device, such as a cellular telephone ("cell phone") or a personal digital assistance ("PDA"). In fact, recently the National Traffic Safety Board ("NTSB") has released a recommendation that the States disallow the use of cell phones by drivers of motor vehicles. The recommendation, which was based on ten years of investigations into distraction-related accidents, not only urged a ban on hand-held cell phones, but also a ban on hands-free cell phones. This is because, according to the Insurance Institute for Highway Safety, there is a large body of evidence showing that talking on a phone, whether hand-held or hands-free, impairs driving and increases ones risk of getting into an automobile accident.

Currently, nine States have banned the use of hand-held cell phones and 35 States have banned texting by drivers. It is likely that more States will adopt restrictions, and it is possible that a complete ban on cell phone usage in vehicles could occur in the near future. However, if such a ban is adopted, enforcement measures will have to be implemented to ensure compliance by drivers of motor vehicles. The tragic cost of noncompliance is evident in the loss of life in accidents caused by cell phone usage while operating a vehicle.

While law enforcement officers can be used to police those who are violating wireless communication laws, such methods are generally ineffective. By way of example, it is hard for an officer to tell whether a driver is on a hands-free phone or merely singing along to a song on the radio. Therefore, there is a need to develop a low cost system and method for limiting, and in some instances disabling, usage of a wireless communication device during operation of a motor vehicle. In fact, such a system and method could further be used to limit, disable and/or enable usage of a wireless communication device in any designated region (e.g., theater, concert hall, classroom, airplane, etc.) and/or during any designated state (e.g., during an event at a theater or a concert hall, during an examination in a classroom, while an airplane is flying, etc.).

SUMMARY OF THE INVENTION

The present invention provides a system and method for limiting, disabling and/or enabling at least one feature of a wireless communication device, such as a cellular telephone ("cell phone"), while the device is in a designated area, such as driving a motor vehicle (e.g., an automobile, bus, truck or other heavy equipment (e.g., forklift, backhoe, etc.), train, or boat), riding on an airplane, or participating in an event (e.g., watching a movie, taking a test, etc.). Preferred embodiments of the present invention operate in accordance with a wireless transmission device and a cell phone, wherein the wireless transmission device is configured to transmit at least a wireless activation (or deactivation) signal, and the cell phone is configured to receive the wireless activation (or deactivation) signal and, in response thereto, activate (or deactivate) certain features of the cell phone.

In a first embodiment of the present invention, at least one infrared ("IR") light emitting diode ("LED"), which may be mounted in a dashboard of a vehicle, is used to direct a wireless signal toward a driver of the vehicle. If a cell phone receives the signal (e.g., is in a detection zone that is substantially around the driver of the vehicle), it may be configured to disable certain features of the cell phone (e.g., cellular service, Bluetooth, telephone calls, text messaging, emailing, its antenna, its keyboard, and/or its display). In doing so, it may limit (or disable) the way in which the driver of the vehicle can use their cell phone. For example, it may not allow the driver to make a telephone call, send (or compose) a text message, and/or send (or compose) an email. It also may not allow the driver to receive a telephone call, receive (or view) a text message, and/or receive (or view) an email. It should be appreciated, however, that the foregoing limitations may not be absolute limitations. For example, the driver may be permitted to communicate in certain emergency situations (e.g., to dial 911, etc.). Further, if certain features are not allowed to be performed while one is driving a car (e.g., using a hand-held cell phone to make a telephone call or send a text), then the driver may be permitted to communicate using another (legal) form of communication (e.g., making a hands-free phone call, sending a hands-free text message, etc.). By way of another example, certain States may only make it illegal to communicate via cell phone while the vehicle is in a particular state (e.g., running, moving, etc.). In such situations, the vehicle may be configured to only transmit the wireless signal if the vehicle is running (e.g., the engine is on, etc.), moving (e.g., the vehicle is in drive, the vehicle is not in park, the vehicle is moving, etc.), etc.

In a second embodiment of the present invention, at least two IR LEDs are used to direct wireless signals toward a driver of a vehicle. This embodiment differs from the first embodiment in that the wireless signals are transmitted in a forward direction, away from the passengers of the vehicle. This embodiment is advantageous over the first embodiment in that the detection zone can be (at least more easily) tailored so that it does not extend (at least substantially) beyond the driver's front seat. In accordance with this embodiment, the IR LEDs can be mounted, for example, in the driver's seat, center console, door panel, and/or headliner.

In a third embodiment of the present invention, a first wireless transmitter is used to send a first wireless signal to a first designated region, which may include the interior of a vehicle. Then, a second wireless transmitter is used to send a second wireless signal to a second designated region, which may be a sub-group of the first designated region, such as the passenger compartments of the vehicle. In this embodiment, the first wireless signal may be used, for example, to disable a feature (or a set of features) of a wireless communication device operating within the vehicle, and the second wireless signal may be used, for example, to enable the feature (or one of the set of features, or the set of features) of the wireless communication device operating within the passenger compartment of the vehicle. Such an embodiment may result in certain features of the driver's wireless device being turned off, and certain features of the passenger's wireless device being turned on.

As discussed above, the present invention preferably includes a wireless transmission device in communication with a cell phone. In one embodiment of the present invention, the wireless transmission device includes an IR modulation circuit, a processor, and a memory device, wherein the processor is used to control the voltage modulation device and to generate the modulated IR signal. The cell phone includes an IR modulation detection circuit, a processor, a memory device, a keypad, and a display, wherein the IR modulation detection circuit is used to detect a wireless signal, and the processor is configured to use the wireless signal to limit usage of the cell phone. This can be done by disabling/enabling certain features (e.g., cellular service, Bluetooth™, telephone calls, text messaging, emailing, its antenna, its keyboard, and/or its display) or disabling/enabling (e.g., power down, etc.) the entire cell phone. The processor may do this by disabling/enabling certain features in firmware (or software) or disabling/enabling various components (e.g., turning off the antenna, disabling the keyboard, disabling the display, etc.).

In one embodiment of the present invention, the cell phone is further (or alternatively) configured to receive a signal via an alternate wireless receiver (e.g., Bluetooth receiver, NEC receiver, small-cell cellular receiver, etc.), or a wired connection (e.g., USB, etc.). By way of example, a cell phone may be configured to disable/enable a first set of features (e.g., phone calls, text messaging, and emailing) when it receives a wireless signal and disable/enable a second set of features (e.g., text messaging and emailing) when the cell phone is plugged into a USB port of the vehicle (i.e., receives a signal via a wired connection). Such a system could be used, for example, to disable the driver's cell phone when it is not plugged into the USB port, and allow only hands-free calling when the cell phone is plugged into the USB port.

A method of transmitting a wireless signal in accordance with one embodiment of the present invention includes determining whether the vehicle is in a restricted state, and if it is, transmitting a wireless signal (e.g., a modulated IR signal, etc.). A method of receiving a wireless signal in accordance with one embodiment of the present invention includes determining whether a particular wireless signal is received, and if it is, disabling at least one feature of the cell phone. For example, as discussed, above, the cell phone could be configured to disable cellular service, Bluetooth™, hand-held phone service, hands-free phone service, texting, emailing, the antenna, the keyboard, the display, etc. In an alternate embodiment of the present invention, a plurality of wireless signals are received, wherein the first wireless signal is used to disable at least one feature of the cell phone (or other wireless device), and the second wireless signal is used to enable the disabled feature (or one of the disabled features) of the cell phone (or other wireless device).

A more complete understanding of a system and method for limiting, disabling or activating cell phone usage during operation of a motor vehicle will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for limiting cell phone usage during operation of a motor vehicle. It should be appreciated, however, that while the invention is described herein in terms of a cell phone in a vehicle environment, the invention is not so limited, and can be used to limit, disable or enable any electronic wireless or wired device (e.g., PDA, portable computer, IPAD™, IPOD™, navigation device, Bluetooth™ earpiece, digital camera, etc.) in any environment or designated region (e.g., theater, classroom, airplane, etc.). In the detailed description that follows, like element numerals are used to describe like elements illustrated in one or more figures.

Figure 1:
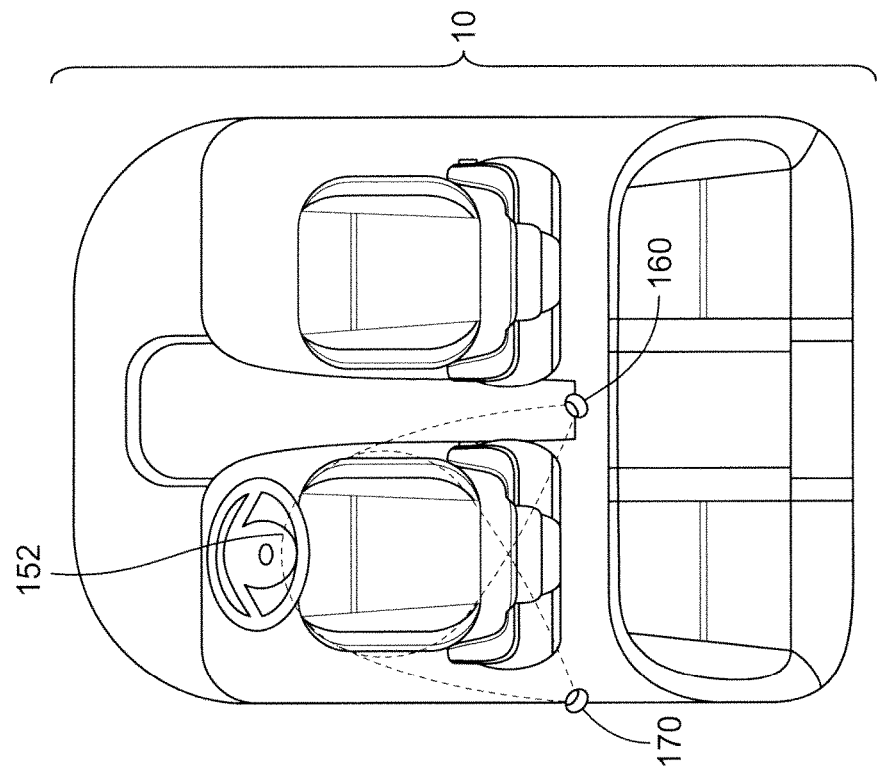
FIG. 1 illustrates the transmission of a wireless signal having a limited beam width in accordance with a first embodiment of the present invention.
Figure 3:
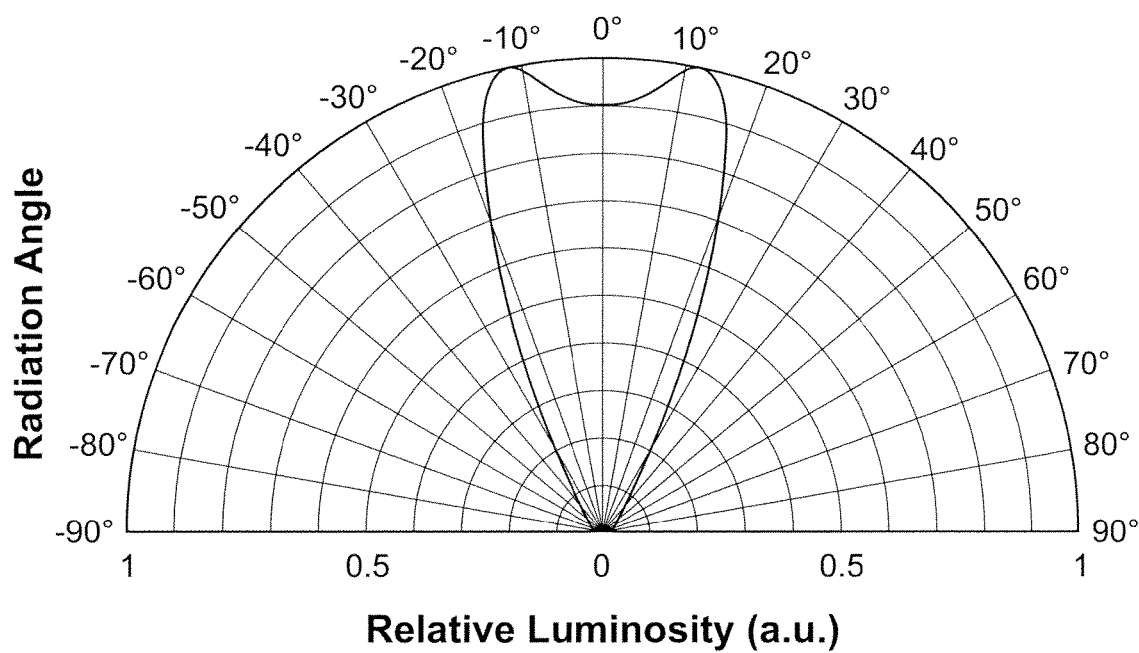
FIG. 3 illustrates an exemplary beam width of the wireless signals illustrated in FIGS. 1 and 2.

As shown in FIG. 1, at least one infrared ("IR") light emitting diode ("LED") 150, which may be mounted in a dashboard 110 of a vehicle 10, is used to direct a wireless signal toward a driver of the vehicle 120. In one embodiment of the present invention, the wireless signal is configured to limit usage of a cell phone that is located in a detection zone 152 that is substantially around the driver of the vehicle 120. By way of example, the detection zone 152 may be roughly 0.9 meters in length by 0.6 meters in width with a 20-30° angle of incidence (see, e.g., FIG. 3). By generating a detection zone 152 that is only around the driver of the vehicle 120, passengers in the vehicle (e.g., front passenger 130 and rear passengers 140) may be permitted to use their cell phones in a non-limited manner. It should be appreciated, however, that the present invention is not limited to the transmission of an IR LED wireless signal, and that other wireless (e.g., Bluetooth™, RF, Near Field Communication (NFC), small-cell cellular base station (e.g., femtocell, etc.) etc.) and wired signals are within the spirit and scope of the present invention. While an IR signal is preferred (e.g., due to its limited beam width), other types of signals could be configured (e.g., via a wired connection, addressing, signal strength (e.g., triangulation), shielding, etc.) to communicate with a cell phone belonging to the driver of the vehicle. It should also be appreciated that the present invention is not limited to a detection zone that is substantially around the driver of the vehicle, and may include other detection zones (e.g., one that encompasses (at least substantially) the front compartment of the vehicle, one that encompasses (at least substantially) the entire interior of the vehicle, one that encompasses (at least substantially) at least one room in a schoolhouse, one that encompasses (at least substantially) at least one room in a theater, one that encompasses (at least substantially) the interior of an airplane, etc.).

As discussed above, the wireless signal is used to limited usage of the driver's cell phone. By way of example, this can be done by using a cell phone that is configured (e.g., by the factory, as required by State law, etc.) to receive and process such a signal. In particular, the cell phone may be configured to receive the signal and to disable at least one feature in response thereto. For example, the cell phone may disable certain features (e.g., cellular service, Bluetooth, telephone calls, text messaging, emailing, its antenna, its keyboard, and/or its display) or it may disable (e.g., power down, etc.) the entire cell phone. In doing so, it may limit (or disable) the way in which the driver of the vehicle can use their cell phone. For example, it may not allow the driver to make a telephone call, send (or compose) a text message, and/or send (or compose) an email. It also may not allow the driver to receive a telephone call, receive (or view) a text message, and/or receive (or view) an email. It should be appreciated, however, that the foregoing limitations may not be absolute limitations. For example, the driver may be permitted to communicate in certain emergency situations (e.g., to dial 911, etc.). Further, if certain features are not allowed to be performed while one is driving a car (e.g., using a hand-held cell phone to make a telephone call or send a text), then the driver may be permitted to communicate using another (legal) form of communication (e.g., making a hands-free phone call, sending a hands-free text message, etc.). By way of another example, certain States may only make it illegal to communicate via cell phone while the vehicle is in a particular state (e.g., running, moving, etc.). In such situations, the vehicle may be configured to only transmit the wireless (limiting/disabling) signal if the vehicle is running (e.g., the engine is on, etc.), moving (e.g., the vehicle is in drive, the vehicle is not in park, the vehicle is moving, etc.), etc. Those of ordinary skill in the art will understand that sensors and similar technology can be used to determine the state of the vehicle.

It should be appreciated that while the application describes embodiments where a wireless communication device is configured to DISABLE at least one feature in response to receiving a wireless signal, a wireless communication device that is configured to ENABLE at least one feature in response to receiving a wireless signal is within the spirit and scope of the present invention. For example, instead of sending an IR signal to a driver of a vehicle to disable certain features of a cell phone, an IR signal that enables these features may be transmitted to the passenger compartments of the vehicle. Such an embodiment could be used, for example, to activate the text messaging feature for cell phones that are only located in the passenger compartments of the vehicle.

It should also be appreciated that while the application describes embodiments where the text messaging feature of a cell phone is either disabled or enabled, a wireless communication device that is configured to disable/enable other features is within the spirit and scope of the present invention. For example, it may be advantageous to disable/enable sound-related features in a movie theater (e.g., disable/enable a ringer or any application that makes a sound), display-related features in an automobile (e.g., disable/enable applications that display messages on a screen), disable/enable keyboard-related features in an automobile (e.g., disable/enable applications that require interaction with a keyboard), a camera feature during a concert, an Internet feature during an examination in a classroom, a wireless-communication feature while an airplane is flying, etc.

Figure 2:
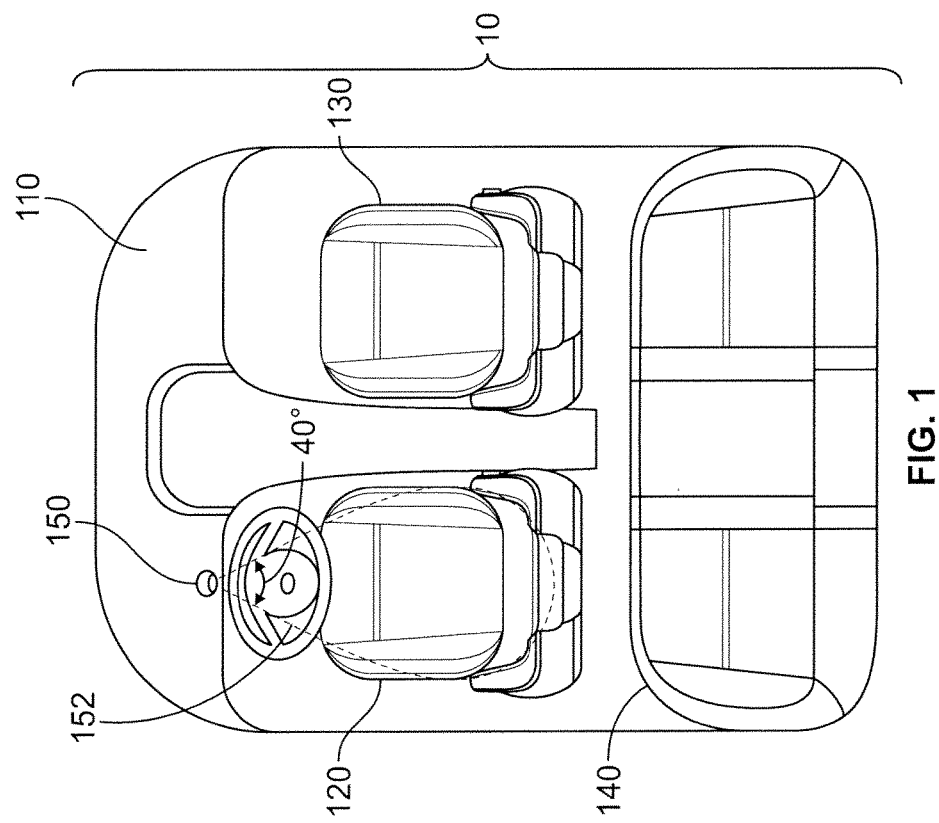
FIG. 2 illustrates the transmission of wireless signals having limited beam widths in accordance with a second embodiment of the present invention.

As shown in FIG. 2, at least two IR LEDs 160, 170 are used to direct wireless signals toward a driver of a vehicle. The embodiment of FIG. 2 differs from FIG. 1 in that the wireless signals are transmitted in a forward direction, away from the passengers of the vehicle. The embodiment of FIG. 2 is advantageous over the embodiment of FIG. 1 in that the detection zone 152 can be (at least more easily) tailored so that it does not extend (at least substantially) beyond the driver's front seat. In accordance with this embodiment, the IR LEDs 160, 170 can be mounted, for example, in the driver's seat, center console, door panel, and/or headliner. It should be appreciated that the present invention is not limited to the use of one or two IR LEDs as shown in FIGS. 1 and 2. For example, a system that uses three or more wireless transmitting devices (e.g., Bluetooth™ transmitter, NFC transmitter, femtocell, etc.) is within the spirit and scope of the present invention. For example, three or more transmitting devices may be used to determine (e.g., via triangulation, etc.) where the wireless communication device is located (e.g., to determine whether the wireless communication device is in a designated region, or a designated subgroup of the region).

Figure 4:
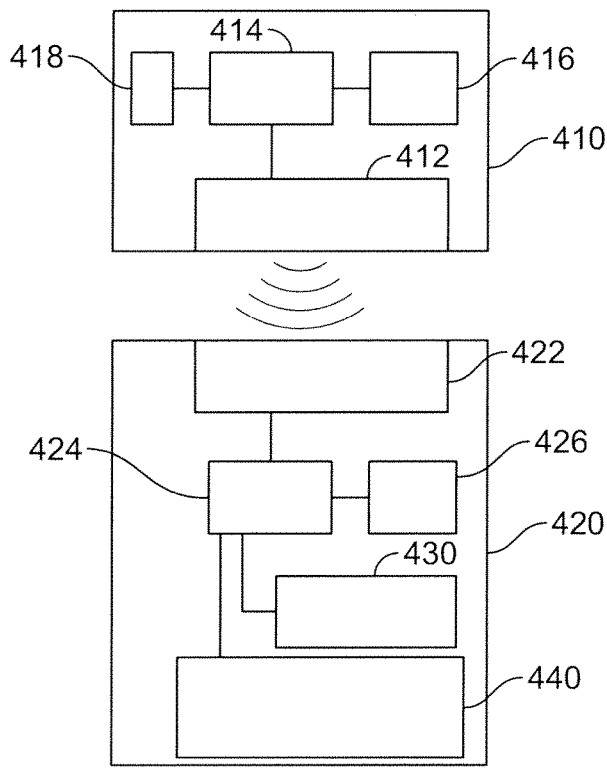
FIG. 4 illustrates a system for limiting usage of a wireless communication device in accordance with one embodiment of the present invention.

FIG. 4 illustrates a system for limiting usage of a cell phone in accordance with one embodiment of the present invention. Specifically, the system includes a wireless transmission device 410 in communication with a cell phone 420, wherein the wireless transmission device 410 (which may be installed, for example, in a vehicle) (see, e.g., FIGS. 1 and 2) includes an IR modulation circuit 412, a processor 414, a memory device 416, and a sensor 418, and the cell phone 420 includes an IR modulation detection circuit 422, a processor 424, a memory device 426, a keypad 430, and a display 440.

Figure 5:
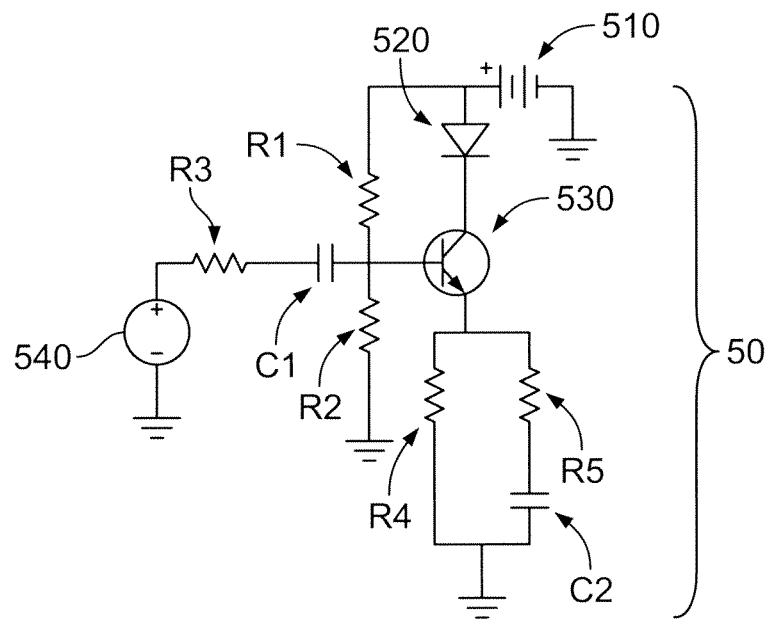
FIGS. 5 and 6 illustrate systems for generating the wireless signals illustrated in FIGS. 1 and 2.
Figure 6:
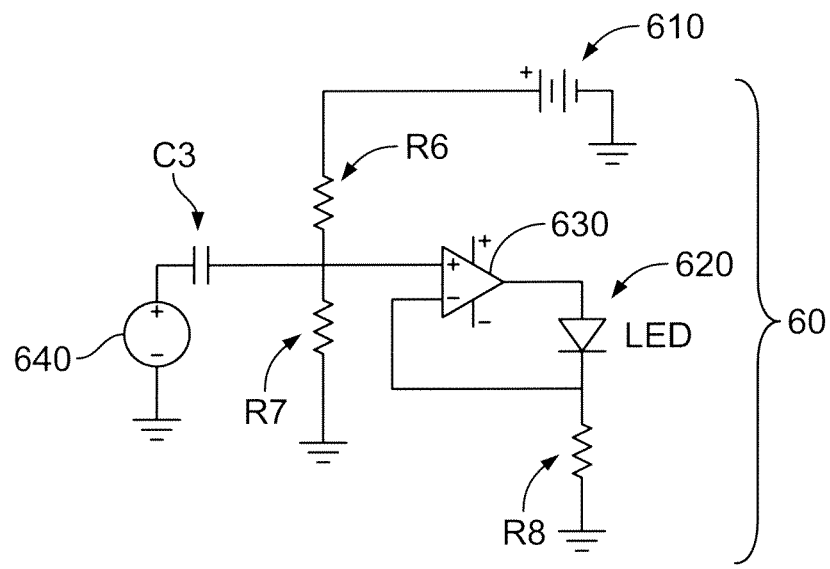

FIG. 5 illustrates one embodiment of an IR modulation circuit 50 which includes a power source 510, an LED 520, at least one resistor (i.e., R1-R5), at least one capacitor C1, C2, a transistor 530, and a voltage modulation device 540. The voltage modulation device 540 can be controlled to draw current through the LED 520, thereby generating a modulated IR signal. FIG. 6 illustrates another embodiment of an IR modulation circuit 60 which includes a power source 610, an LED 620, at least one resistor (i.e., R6-R8), at least one capacitor C3, an op-amp 630, and a voltage modulation device 640. As with FIG. 5, the voltage modulation device 640 can be controlled to draw current through the LED 620, thereby generating a modulated IR signal.

Referring back to FIG. 4, the processor 414, which may be configured to run firmware (or software) stored in the memory device 416, may be used to control the voltage modulation device and to generate the modulated IR signal. In a preferred embodiment, the processor is configured to generate the modulated IR signal when the vehicle is in a restricted state. The state of the vehicle can be determined from the sensor 418, which may include, for example, a mechanical and/or electrical sensor configured to determine whether the vehicle's transmission is in gear, the vehicle is moving (either forward or backward), the vehicle's speed is at or above a predetermined speed, and/or the vehicle is in a restricted location (e.g., in restricted State, on a restricted road, etc.). It should be appreciated that if the invention is being used in another environment, the sensor (or a switch) could be used to sense (or select) a particular state, such as movement (e.g., taxiing, flying, etc.) of an airplane, activity (e.g., the beginning of a movie, the start of an examination, etc.) in a room, etc. It should also be appreciated that the present invention is not limited to the wireless transmission device 410 illustrated in FIG. 4. For example, a wireless transmission device that includes additional components (e.g., a switch (e.g., operatively connected to the processor) for controlling the power source based on the state of the vehicle, etc.) is within the spirit and scope of the present invention. By way of another example, an IR modulation circuit that is an off-the-shelf LED driver chip (e.g., Atmel ATtiny28 circuit, etc.), is also within the spirit and scope of the present invention.

With reference to FIG. 4, the cell phone 420 is configured to limit its usage if a wireless signal (e.g., a properly modulated IR signal) is received. Specifically, after the IR modulation detection circuit 422 detects a wireless signal, the processor 424, which may be configured to run firmware (or software) stored in the memory device 426, is configured to limit usage of the cell phone. This can be done by disabling certain features (e.g., cellular service, Bluetooth™, telephone calls, text messaging, emailing, its antenna, its keyboard, and/or its display) or disabling (e.g., power down, etc.) the entire cell phone. The processor may do this by disabling certain features in firmware (or software) or disabling various components (e.g., turning off the antenna (not shown), disabling the keyboard 430, disabling the display 440, etc.). It should be appreciated that the present invention is not limited to the cell phone 420 illustrated in FIG. 4. By way of example, a cell phone that includes additional (or different) components is within the spirit and scope of the present invention. For example, the IR modulation detection circuit 422 could be any circuit, as known to those skilled in the art, capable of detecting a wireless signal (e.g., a properly modulated IR signal, etc.). The IR modulation detection circuit 422 could also be an off-the-shelf IR receiver chip, such as the Atmel ATA2536T low-voltage IR receiver chip.

It should also be appreciated that while the IR modulation detection circuit has been described in terms of a circuit for detecting a particular wireless signal (e.g., an activation signal), the present invention is not so limited. For example, the wireless transmission device and the cell phone could be configured to transmit and receive, respectively, different wireless signals (e.g., IR signals of different modulation, Bluetooth™, NFC or cellular signals having different payloads, etc.), where each wireless signal corresponds to a different function. For example, a first wireless signal could be used to initiate (or initialize) the cell phone (e.g., identify a particular protocol or standard that the vehicle complies with, etc.), a second wireless signal could be used to disable a first set of features (e.g., if the vehicle is in a first state (e.g., park, running, operating at or above a particular speed, etc.), if the vehicle is registered or located in a State that does not allow the first set of features if the cell phone operator is also operating a motor vehicle, etc.), a third wireless signal could be used to disable a second set of features (e.g., if the vehicle is in a second state, if the vehicle is registered or located in a State that does not allow the second set of features if the cell phone operator is also operating a motor vehicle, etc.), and a fourth wireless signal could be used to provide additional information to the cell phone (e.g., identify the state of the vehicle, identify the State in which the vehicle is registered or located in, provide GPS information on the vehicle, etc.).

Further, the cell phone and the wireless transmission device could also be configured to transmit and receive, respectively, at least one wireless signal. For example, a first wireless signal could be used to acknowledge the reception of a wireless signal from the vehicle, a second wireless signal could be used to enable or disable a particular set of features on the vehicle (e.g., enable hand-free phone calls, disable the wireless transmission device, etc.), and a third wireless signal could be used to provide additional information to the vehicle (e.g., the make and/or model number of the cell phone, the protocols or standards that the cell phone supports, etc.). Any of the foregoing signals could then be used to disable, enable or limit certain wireless communication features, regardless of whether the features are being carried out through the cell phone alone, or through a combination of the cell phone and the vehicle's hands-free communication system. For example, GPS information (e.g., as received by a GPS device in the cell phone, as received by a GPS device in the vehicle and transmitted to the cell phone, etc.) could be used, either alone or together with other information (e.g., information on a state of the vehicle, etc.), to limit or disable usage of the cell phone.

As discussed above, the present invention is also not limited to a cell phone configured to receive/process an IR signal. For example, a cell phone that is further (or alternatively) configured to receive a Bluetooth, NFC or small cell signal, or a signal via a wired connection (e.g., USB, etc.) is also within the sprit and scope of the present invention. By way of example, a cell phone could be configured to disable a first set of features (e.g., phone calls, text messaging, and emailing) when it receives a wireless signal and disable a second set of features (e.g., text messaging and emailing) when the cell phone is plugged into a USB port of the vehicle (i.e., receives a signal via a wired connection). Such a system could be used to disable the driver's cell phone when it is not plugged into the USB port, and allow only hands-free calling when the cell phone is plugged into the USB port. It should be appreciated that if a wired connection is used, the cell phone could either be configured to ignore the wireless signal once it receives a wired signal, or the vehicle could be configured to cancel (i.e., cease transmission of) the wireless signal once the cell phone is connected to the wired connection.

Figure 9:
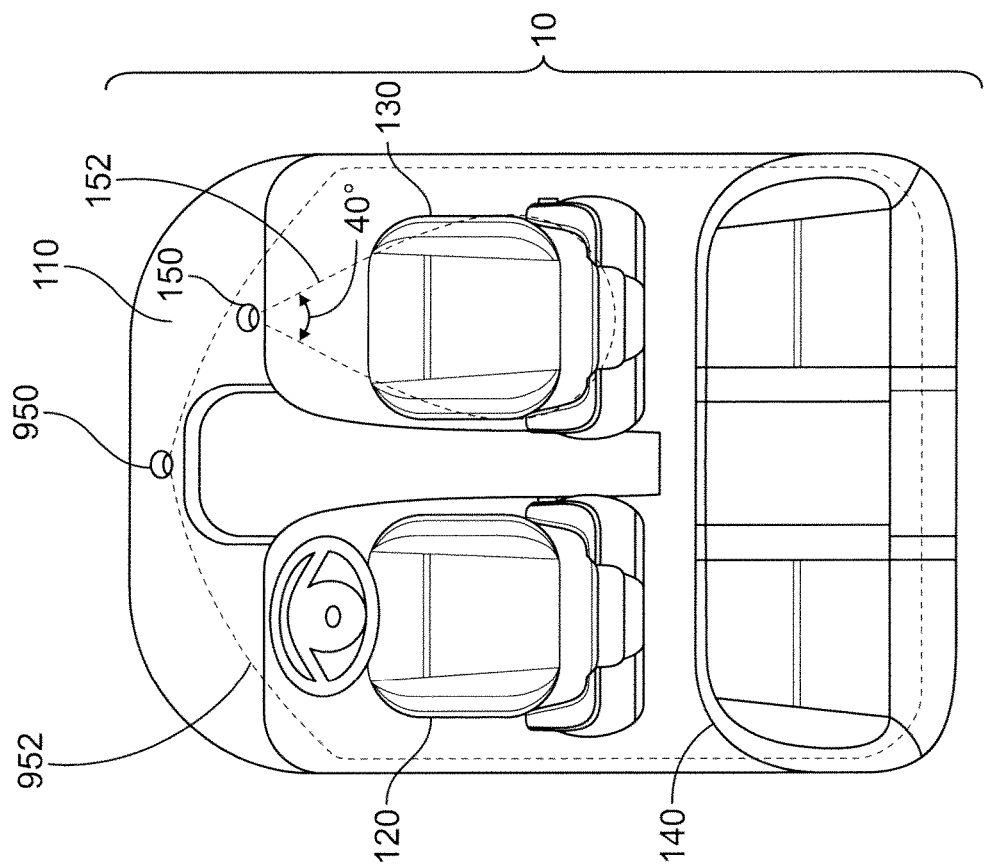
FIG. 9 illustrates the transmission of a wireless signal having a limited beam width in accordance with a third embodiment of the present invention.

In another embodiment of the present invention, as shown in FIG. 9, more than one wireless signal is used to indicate whether a wireless communication device is in a first designated region or a second designated region, wherein the second designated region is a subset of the first designated region. For example, using the example of a vehicle, a first wireless transmitter 950 (e.g., a Bluetooth transmitter, etc.) could be used to transmit a first wireless signal to a detection zone 952 that is substantially the entire interior of the vehicle. A second wireless transmitter 150 (e.g., IR transmitter, etc.) could be used to transmit a second wireless signal to a detection zone 152 that is substantially the front-passenger compartment of the vehicle. Any wireless device that is being operated within the vehicle would then be configured to disable a feature (or a set of features) in response to receiving the first wireless signal, and enable the feature (or at least one of the set of features, or the entire set of features) in response to receiving both the first and second wireless signals. It should be appreciated that while the detection zone 152 is shown as the front-passenger compartment of the vehicle, a detection zone that further includes a different "zone" (e.g., another passenger compartment of the vehicle, etc.) is within the spirit and scope of the present invention. It should also be appreciated that a different number of wireless transmitters may be used to transmit the first and/or second wireless signals. For example, two wireless transmitters could be used to create a first zone (see, e.g., FIG. 2), three wireless transmitters could be used to create a second zone (e.g., defining more than "zone," or more than one passenger compartment, using triangulation to define a "zone," or a passenger compartment, etc.)

Such a system could be used, for example, to prohibit a driver of the vehicle from sending text messages on his cell phone, while allowing the passengers of the vehicle to send text messages on their cell phones. In this example, the driver's cell phone only gets the first (e.g., Bluetooth) wireless signal, and the passengers' cell phones get both the first (e.g., Bluetooth) and second (e.g., IR) wireless signals.

Such a system could also be used, for example, to define at least three different states, i.e., a first state where the wireless communication device does not receive either the first or second wireless signal, a second state where the wireless communication device only receives the first wireless signal, and a third state where the wireless communication device receives both the first and second wireless signals. In this example, all of the wireless communication device's features would be enabled in the first state, one or more features would be disabled in the second state, and the at least one of the disabled features would be enabled in the third state. It should be appreciated that the present invention is not limited to three states, and more than two signals can be used to identify different designated regions (or sub-regions thereof) and/or different states in a particular region. For example, a fourth state could be identified by receiving only the second wireless signal, additional states could be identified by receiving a third wireless signal (either alone or in conjunction with the first and/or second wireless signal), etc.

Figure 7:
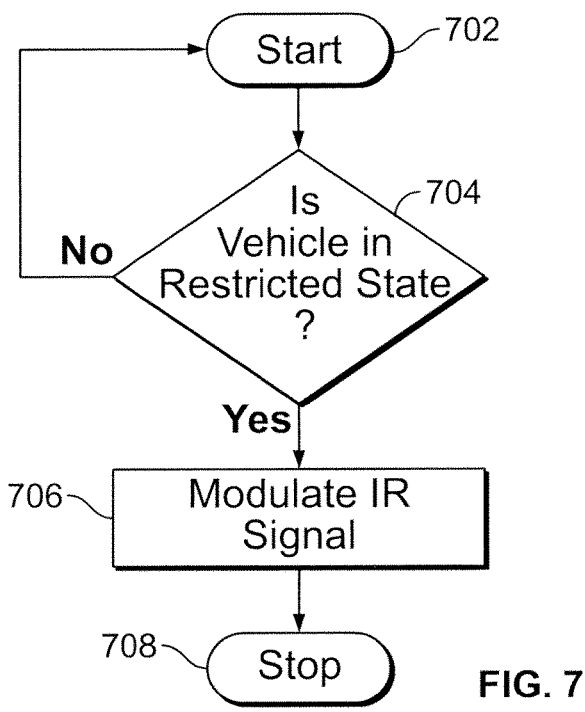
FIG. 7 illustrates a method for generating/transmitting a wireless signal in accordance with a first embodiment of the present invention.

A method of generating/transmitting a wireless signal in accordance with a first embodiment of the present invention is illustrated in FIG. 7. The method, which starts at step 702, determines whether the vehicle is in a restricted state at step 704. The restricted state could be, for example, the vehicle being in drive, the vehicle not being in park, the vehicle moving, the vehicle traveling above a predetermined speed, the engine running, etc. If the vehicle is not in a restricted state, then the process starts over at step 702, and no wireless signal (or a differently modulated IR signal) is transmitted. If, however, the vehicle is in a restricted state, then a wireless signal (e.g., a modulated IR signal, etc.) is generated and transmitted at step 706, stopping the process at step 708. It should be appreciated that the process illustrated in FIG. 7 may include additional (or different) steps, or steps that are performed in a different order. For example, instead of stopping at step 708, it could be determined whether the vehicle is in a restricted state. If it is then the wireless signal is generated and transmitted (again) at step 706. If it is not, then the process starts over at step 702, and no wireless signal (or a differently modulated IR signal) is transmitted.

Figure 8:
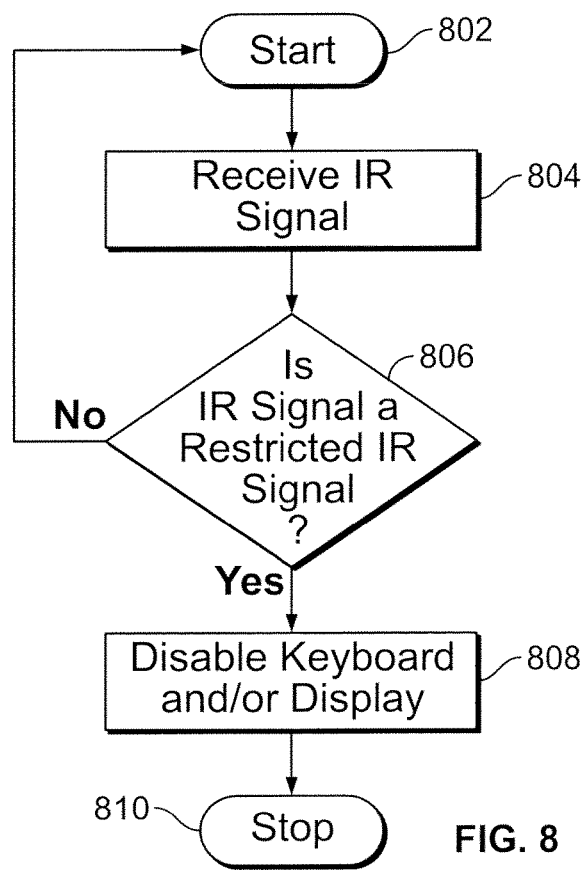
FIG. 8 illustrates a method for receiving/processing a wireless signal in accordance with a first embodiment of the present invention.

A method of receiving/processing a wireless signal in accordance with one embodiment of the present invention is illustrated in FIG. 8. The method, which starts at step 802, determines whether a wireless signal (e.g., a properly modulated IR signal, etc.) is received at steps 804 and 806. If the wireless signal has not been received, then the process starts over at step 802. If, however, the wireless signal has been received, then at least one feature of the cell phone is disabled at step 808, ending the process at step 810. For example, as discussed, above, the cell phone could be configured to disabled cellular service, Bluetooth™, hand-held phone service, hands-free phone service, texting, emailing, the antenna, the keyboard, and/or the display. It should be appreciated that the process illustrated in FIG. 8 may include additional (or different) steps, or steps that are performed in a different order. For example, before disabling the at least one feature, it could be determined whether the cell phone is plugged into a wired connection (e.g., a USB port, etc.), or receiving a wired signal. If it is not, then at least one feature of the cell phone could be disabled at step 808. If it is plugged into the wired connection, then a different set of features could be disabled (e.g., disabling texting but not hands-free calling, etc.). By way of another example, instead of stopping at step 810, the process could loop-back to determine whether a wireless signal is received at steps 804 and 806. If a wireless signal is not received, then the cell phone (or a feature thereof) is re-enabled, and the process starts over at step 802. If a wireless signal is received, then the at least one feature of the cell phone is disabled (or remains disabled) at step 808, and the loop-back continues until a wireless signal is not received.

Figure 10:
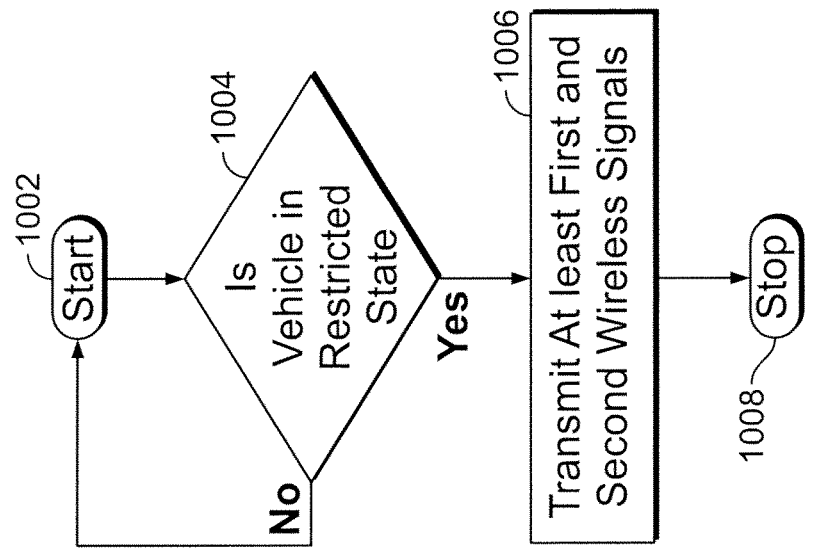
FIG. 10 illustrates a method for generating/transmitting a wireless signal in accordance with a second embodiment of the present invention.

A method of generating/transmitting a plurality of wireless signals in accordance with a second embodiment of the present invention is illustrated in FIG. 10. The method, which starts at step 1002, determines whether the vehicle is in a restricted state at step 1004. The restricted state could be, for example, the vehicle being in drive, the vehicle not being in park, the vehicle moving, the vehicle traveling above a predetermined speed, the engine running, etc. If the vehicle is not in a restricted state, then the process starts over at step 1002, and no wireless signal is transmitted. If, however, the vehicle is in a restricted state, then a plurality of wireless signals (e.g., a Bluetooth signal, a modulated IR signal, etc.) is generated and transmitted at step 1006, stopping the process at step 1008. It should be appreciated that the process illustrated in FIG. 10 may include additional (or different) steps, or steps that are performed in a different order. For example, instead of stopping at step 1008, it could be determined whether the vehicle is in a restricted state. If it is then the wireless signal is generated and transmitted (again) at step 1006. If it is not, then the process starts over at step 1002, and no wireless signal is transmitted.

Figure 11:
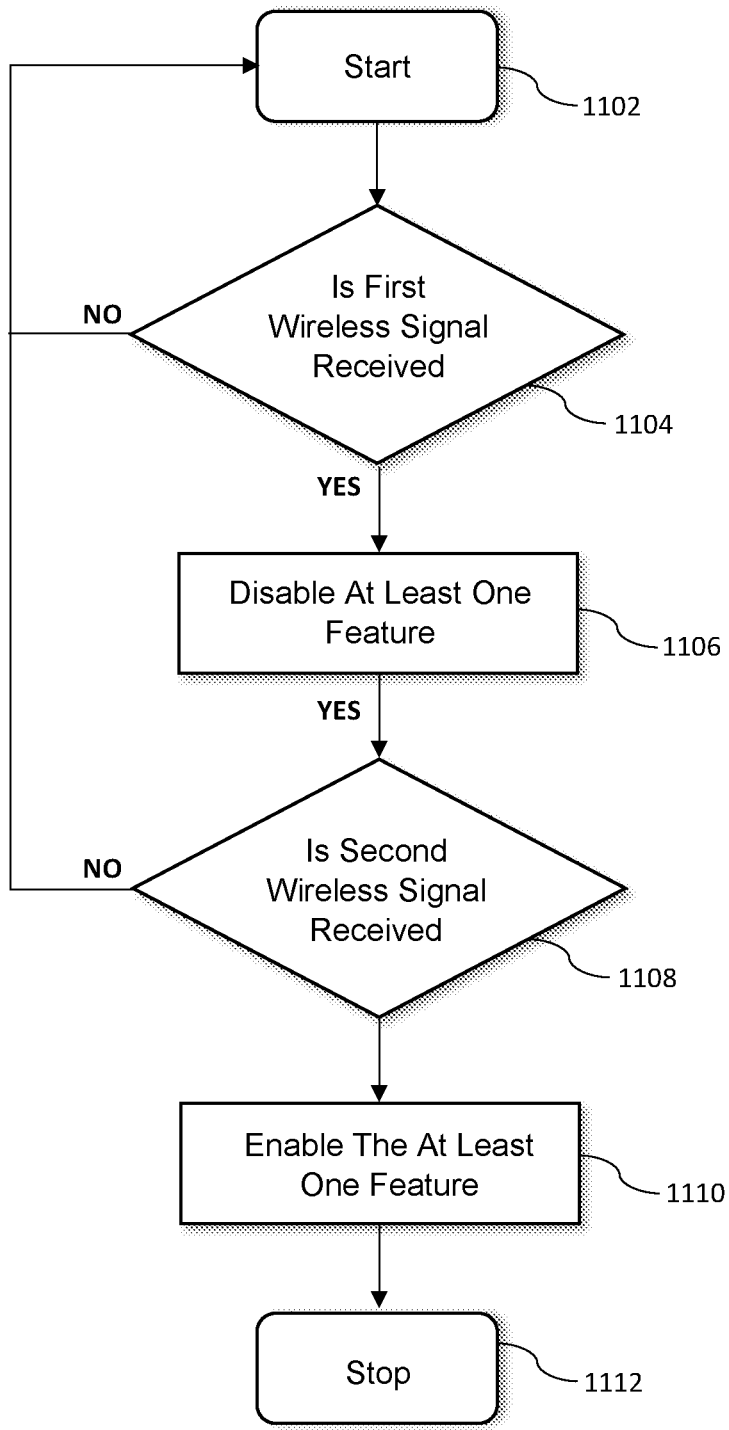
FIG. 11 illustrates a method for receiving/processing a wireless signal in accordance with a second embodiment of the present invention.

A method of receiving/processing a wireless signal in accordance with a second embodiment of the present invention is illustrated in FIG. 11. The method, which starts at step 1102, determines whether a first wireless signal (e.g., a Bluetooth signal, etc.) is received at step 1104. If the first wireless signal has not been received, then the process starts over at step 1102. If, however, the first wireless signal has been received, then at least one feature of the wireless communication device is disabled at step 1106. A determination is then made as to whether the second wireless signal (e.g., a properly modulated IR signal, etc.) is received at steps 1108. If the second wireless signal has not been received, then the process starts over at step 1102. If, however, the second wireless signal has been received, then the disabled feature (or at least one of the disabled features) of the wireless communication device is enabled at step 1110, ending the process at step 1112. For example, as discussed, above, the wireless communication device could be configured to disabled text messaging in response to receiving the first wireless signal, and enable text messaging in response to receiving the second wireless signal. Such a method would prevent a wireless communication device that only receives the first wireless signal (e.g., the driver's cell phone, etc.) from creating, sending and/or receiving a text message, and would allow a wireless communication device that receives both the first and second wireless signals (e.g., the passenger's cell phone, etc.) to create, send, and/or receive a text message.

It should be appreciated that the process illustrated in FIG. 11 may include additional (or different) steps, or steps that are performed in a different order. For example, instead of stopping at step 1112, the process could loop-back to determine whether a first wireless signal is received at steps 1104. If a first wireless signal is not received, then the cell phone (or a feature thereof) is re-enabled, and the process starts over at step 1102. If a first wireless signal is received, then the at least one feature of the cell phone is disabled (or remains disabled) at step 1106, and the loop-back continues by checking whether a second wireless signal is received at step 1112. By way of another example, steps 1104 and 1108 could be combined, so that the determinations of whether the first and second wireless signals are received happen before any feature is disabled. Such an embodiment would allow a cell phone to determine whether the second wireless signal has been received before disabling any feature that is linked (or tied) to the reception of the first wireless signal.

The foregoing description of a system and method for limiting cell phone usage during operation of a motor vehicle has been presented for the purposes of illustration and description. It is not intended to be exhaustive or to limit the invention to the precise forms disclosed, and many modifications and variations are possible in light of the above teachings. Those skilled in the art will appreciate that there are a number of ways to implement the foregoing features, and that the present invention it not limited to any particular way of implementing these features. The invention is solely defined by the following claims.

What is claimed is:

1. A method for limiting usage of at least one feature of a wireless communication device within a vehicle, comprising:
    determining whether said vehicle is in a restricted state;
    transmitting a disabling wireless signal from a first wireless transmission device toward a first designated region only when said vehicle is in said restricted state, said first designated region including an interior of said vehicle;
    transmitting an enabling wireless signal from a second wireless transmission device toward a second designated region only when said vehicle is in said restricted state, said second designated region being a subset of said interior of said vehicle;
    determining by a processor within said wireless communication device whether said disabling and enabling wireless signals have been received from said first and second wireless transmission devices, respectively;
    disabling by said processor said at least one feature of said wireless communication device when only said disabling wireless signal is received during a period of time when both said disabling and enabling wireless signals are being transmitted; and
    maintaining by said processor said at least one feature of said wireless communication device in an enabled state when both said disabling and enabling wireless signals are received during said period of time when both said disabling and enabling wireless signals are being transmitted;
    wherein said at least one feature of said wireless communication device is not disabled when both said disabling and enabling wireless signals are received during said period of time when both said disabling and enabling wireless signals are being transmitted.

2. The method of claim 1, wherein said step of determining whether said vehicle is in a restricted state comprises determining whether said vehicle is at least one of running, in gear, moving, traveling above a predetermined speed, and in a restricted location.

3. The method of claim 1, wherein said step of transmitting a-first disabling wireless signal from a first wireless transmission device comprises transmitting a first disabling wireless signal from one of a Bluetooth transmission device and a first infrared transmission device.

4. The method of claim 3, wherein said step of transmitting an enabling wireless signal from a second wireless transmission device comprises transmitting an enabling wireless signal from a second infrared transmission device.

5. The method of claim 1, wherein said first designated region includes a driver region of said vehicle and a passenger region of said vehicle and said second designated region includes said passenger region of said vehicle and excludes said driver region of said vehicle.

6. The method of claim 1, wherein said at least one feature of said wireless communication device includes at least one of non-emergency telephone calls, text messaging, emailing, a user input portion, and a display portion.

7. A system for limiting usage of at least one wireless communication feature, comprising:
    a vehicle for transmitting wireless signals during a restricted state; comprising:
        a sensor for determining whether said vehicle is in said restricted state;
        a first wireless transmission device for transmitting a disabling wireless signal toward a first designated region only when said vehicle is in said restricted state, said first designated region including an interior of said vehicle;
        a second wireless transmission device for transmitting an enabling wireless signal toward a second designated region only when said vehicle is in said restricted state, said second designated region being a subset of said interior of said vehicle; and
    a wireless communication device that can be used within said vehicle, said wireless communication device being adapted to:
        determine whether said disabling and enabling wireless signals have been received from said first and second wireless transmission devices, respectively;
        disable said at least one wireless communication feature of said wireless communication device when only said disabling wireless signal is received during a period of time when both said disabling and enabling wireless signals are being transmitted; and
        maintain said at least one wireless communication feature of said wireless communication device in an enabled state when both said disabling and enabling wireless signals are received during said period of time when both said disabling and enabling wireless signals are being transmitted;
    wherein said at least one wireless communication feature of said wireless communication device is not disabled when both said disabling and enabling wireless signals are received during said period of time when both said disabling and enabling wireless signals are being transmitted.

8. The system of claim 7, wherein said vehicle is in said restricted state when said vehicle is at least one of running, in gear, moving, traveling above a predetermined speed, and in a restricted location.

9. The system of claim 7, wherein said first wireless transmission device comprises one of a Bluetooth transmission device and a first infrared transmission device.

10. The system of claim 9, wherein said second wireless transmission device comprises a second infrared transmission device.

11. The system of claim 7, wherein said first designated region includes a driver region of said vehicle and a passenger region of said vehicle and said second designated region includes said passenger region of said vehicle and excludes said driver region of said vehicle.

12. The system of claim 7, wherein said at least one wireless communication feature of said wireless communication device includes at least one of non-emergency telephone calls, text messaging, emailing, a user input portion, and a display portion.

13. The system of claim 7, wherein said wireless communication device comprises one of a computer, a tablet, and a cellular telephone.

14. A method for limiting usage of at least one feature of a wireless communication device within a vehicle, comprising:

transmitting a disabling wireless signal toward a first designated region, said first designated region including at least a driver portion of said vehicle and a passenger portion of said vehicle;

transmitting an enabling wireless signal toward a second designated region, said second designated region including at least said passenger portion of said vehicle and excluding at least said driver portion of said vehicle, said second wireless signal being separate and distinct from said first wireless signal;

determining by a processor within said wireless communication device whether said disabling and enabling wireless signals have been received;

disabling by said processor said at least one feature of said wireless communication device when only said disabling wireless signal is received during a period of time when both said disabling and enabling wireless signals are being transmitted; and maintaining by said processor said at least one feature of said wireless communication device in an enabled state when both said disabling and enabling wireless signals are received during said period of time when both said disabling and enabling wireless signals are being transmitted;

wherein said at least one feature of said wireless communication device is not disabled when both said disabling and enabling wireless signals are received during said period of time when both said disabling and enabling wireless signals are being transmitted.

15. The method of claim 14, further comprising the step of determining whether said vehicle is in a restricted state, said disabling and enabling wireless signals being transmitted when said vehicle is in said restricted state.

16. The method of claim 14, wherein said step of transmitting said disabling wireless signal comprises transmitting a Bluetooth signal.

17. The method of claim 14, wherein said step of transmitting said disabling wireless signal comprises transmitting a first infrared signal.

18. The method of claim 16, wherein said step of transmitting said enabling wireless signal comprises transmitting an infrared signal.

19. The method of claim 17, wherein said step of transmitting said enabling wireless signal comprises transmitting a second infrared signal.

20. The method of claim 14, wherein said at least one feature of said wireless communication device includes at least one of non-emergency telephone calls, text messaging, emailing, a user input portion, and a display portion.

* * * * *